(12) United States Patent
Yang

(10) Patent No.: US 11,170,437 B2
(45) Date of Patent: Nov. 9, 2021

(54) BLOCKCHAIN-BASED FINANCING

(71) Applicant: Advanced New Technologies Co., Ltd., George Town (KY)

(72) Inventor: Xinying Yang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/888,421

(22) Filed: May 29, 2020

(65) Prior Publication Data

US 2020/0294140 A1    Sep. 17, 2020

Related U.S. Application Data

(63) Continuation of application No. PCT/CN2019/075778, filed on Feb. 22, 2019.

(30) Foreign Application Priority Data

Jun. 8, 2018 (CN) .......................... 201810589585.3

(51) Int. Cl.
*G06Q 40/02* (2012.01)
*G06Q 10/08* (2012.01)
(Continued)

(52) U.S. Cl.
CPC ......... *G06Q 40/025* (2013.01); *G06Q 10/087* (2013.01); *G06Q 20/405* (2013.01); *H04L 9/0637* (2013.01)

(58) Field of Classification Search
CPC ...... G06Q 40/025; G06Q 40/02; G06Q 40/00; G06Q 10/087; G06Q 10/08; G06Q 10/00;
(Continued)

(56) References Cited

U.S. PATENT DOCUMENTS

2006/0015422 A1* 1/2006 Dion .................. G06Q 40/00
                                                                705/35
2012/0054088 A1* 3/2012 Edrington ........... G06Q 40/025
                                                                705/38
(Continued)

FOREIGN PATENT DOCUMENTS

CN          106682983          5/2017
CN          107077675          8/2017
(Continued)

OTHER PUBLICATIONS

Damian Gruber et al., Unifying Lightweight Blockchain Client Implementations, <https://dx.doi.org/10.14722/diss.2018.23010> (Feb. 18, 2018) (Year: 2018).*

(Continued)

*Primary Examiner* — Scott S Trotter
*Assistant Examiner* — Divesh Patel
(74) *Attorney, Agent, or Firm* — Fish & Richardson P.C.

(57) ABSTRACT

A computer-implemented supply chain method includes obtaining, by a core node of a blockchain, from a ledger of the blockchain, a financing transaction published by a light node of the blockchain, in which the financing transaction includes account receivable information; determining, by the core node, a grant limit of financing, a repayment period of the financing, and a loan interest rate of the financing based on the account receivable information; and publishing, by the core node, to the ledger, a financing management smart contract, in which the financing management smart contract specifies the determined grant limit of the financing, the determined repayment period of the financing, and the determined loan interest rate of the financing, and in which the financing management smart contract is invocable by the light node to complete a management operation of the financing.

16 Claims, 3 Drawing Sheets

(51) Int. Cl.
*G06Q 20/40* (2012.01)
*H04L 9/06* (2006.01)

(58) Field of Classification Search
CPC .... G06Q 20/405; G06Q 20/401; G06Q 20/40; G06Q 20/389; G06Q 20/38; G06Q 20/00; H04L 9/0637; H04L 9/0618; H04L 9/06; H04L 9/00

See application file for complete search history.

(56) References Cited

U.S. PATENT DOCUMENTS

| | | | | |
|---|---|---|---|---|
| 2016/0371771 | A1* | 12/2016 | Serrano | G06Q 40/025 |
| 2018/0075421 | A1* | 3/2018 | Serrano | G06Q 20/105 |
| 2018/0096360 | A1 | 4/2018 | Christidis et al. | |
| 2018/0097779 | A1* | 4/2018 | Karame | G06Q 20/382 |
| 2018/0097780 | A1* | 4/2018 | Olivier | G06Q 20/385 |
| 2019/0172021 | A1* | 6/2019 | Watson | H04L 9/0838 |
| 2019/0180276 | A1* | 6/2019 | Lee | H04L 63/10 |

FOREIGN PATENT DOCUMENTS

| | | |
|---|---|---|
| CN | 107220896 | 9/2017 |
| CN | 107220896 A * | 9/2017 |
| CN | 107292536 | 10/2017 |
| CN | 107292735 | 10/2017 |
| CN | 107301522 | 10/2017 |
| CN | 107341402 | 11/2017 |
| CN | 107845032 | 3/2018 |
| CN | 108122159 | 6/2018 |
| CN | 109087190 | 12/2018 |
| TW | M422714 | 2/2012 |
| TW | M543413 | 6/2017 |
| WO | WO 2017190175 | 11/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

International Search Report and Written Opinion in International Application No. PCT/CN2019/075778, dated May 20, 2019, 12 pages (with partial English translation).

Nakamoto, "Bitcoin: A Peer-to-Peer Electronic Cash System," www.bitcoin.org, 2005, 9 pages.

PCT International Preliminary Report on Patentability in International Application No. PCT/CN2019/075778, dated Dec. 8, 2020, 11 pages (with English translation).

* cited by examiner

US 11,170,437 B2

BLOCKCHAIN-BASED FINANCING

CROSS-REFERENCE TO RELATED APPLICATIONS

This application is a continuation of PCT Application No. PCT/CN2019/075778, filed on Feb. 22, 2019, which claims priority to Chinese Patent Application No. 201810589585.3, filed on Jun. 8, 2018, and each application is hereby incorporated by reference in its entirety.

TECHNICAL FIELD

The present application relates to the field of information processing technologies, and in particular, to financing methods and apparatuses.

BACKGROUND

In the supply chain finance field, suppliers cannot receive accounts receivable in a short term, but need a large amount of capital. As debtors, core enterprises cannot provide more help for the suppliers other than making repayment on time. Financial institutions such as banks and factoring companies not only have idle funds but also have high credits, so how to use their high credits to improve utilization of the idle funds is also a problem for the financial institutions.

SUMMARY

To alleviate the problem of accounts receivable-based financing, the present specification provides financing methods, applied to a blockchain-based supply chain financial system, where the supply chain financial system includes a light node and a core node, and the method includes: obtaining, by the core node from the blockchain, a target transaction initiated by the light node for financing, where the target transaction includes account receivable information; determining a grant limit, a repayment period, and a loan interest rate of financing based on the account receivable information; and publishing a smart contract for financing management to the blockchain, where the smart contract specifies the determined grant limit, repayment period, and loan interest rate of the financing, so the light node invokes the smart contract to complete a management operation on the financing.

Preferably, at least some service resources on the light node are entrusted to the core node; and before the publishing a smart contract for financing management to the blockchain, the method further includes: determining an entrusting fee based on an entrusting service type of the light node; and adjusting the determined repayment period or loan interest rate of the financing based on the entrusting fee.

Preferably, the target transaction further includes an entrusting fee payment method specified by the light node, and the entrusting fee payment method includes a first payment method for converting the entrusting fee into the repayment period of the financing, and a second payment method for converting the entrusting fee into the loan interest rate of the financing; and adjusting the determined repayment period or loan interest rate of the financing based on the entrusting fee includes: determining a specific type of an entrusting fee payment method specified by an initiator of the target transaction; if the entrusting fee payment method is the first payment method, converting the entrusting fee into the repayment period of the financing, and adjusting the determined repayment period of the financing based on the converted repayment period; and if the entrusting fee payment method is the second payment method, converting the entrusting fee into the loan interest rate of the financing, and adjusting the determined loan interest rate of the financing based on the converted interest rate.

Preferably, the target transaction further includes an entrusting fee payment method specified by the light node, where the entrusting fee payment method includes a third payment method for separately paying the entrusting fee, and the method further includes: if the entrusting fee payment method is the third payment method, skipping adjusting the determined repayment period or loan interest rate of the financing.

Preferably, the core node is a financial institution node and a core enterprise node that are related to financing management, and the light node is a supplier node related to financing management.

Correspondingly, the present specification further provides a financing method, applied to a blockchain-based supply chain financial system, where the supply chain financial system includes a light node and a core node, and the method includes: publishing, by the light node, a target transaction for financing to the blockchain, where the target transaction includes account receivable information; and invoking a smart contract published by the core node for financing management, where the smart contract specifies a grant limit, a repayment period, and a loan interest rate of the financing that are determined by the core node, so as to complete a management operation on the financing.

Correspondingly, the present specification further provides a financing apparatus, applied to a blockchain-based supply chain financial system, where the supply chain financial system includes a light node and a core node, and the apparatus includes: an acquisition unit, configured to obtain, by the core node from the blockchain, a target transaction initiated by the light node for financing, where the target transaction includes account receivable information; a calculation unit, configured to determine, by the core node, a repayment period and a loan interest rate of financing based on the account receivable information; and a smart contract deployment unit, configured to publish, by the core node to the blockchain, a smart contract for financing management, where the smart contract specifies the determined repayment period and loan interest rate of the financing, so the light node invokes the smart contract to complete a management operation on the financing.

Preferably, at least some service resources on the light node are entrusted to the core node; and the calculation unit is configured to: determine, by the core node, an entrusting fee based on an entrusting service type of the light node; and adjust the determined repayment period or loan interest rate of the financing based on the entrusting fee.

Preferably, the target transaction further includes an entrusting fee payment method specified by the light node, and the entrusting fee payment method includes a first payment method for converting the entrusting fee into the repayment period of the financing, and a second payment method for converting the entrusting fee into the loan interest rate of the financing; and the calculation unit is configured to: determine a specific type of an entrusting fee payment method specified by an initiator of the target transaction; if the entrusting fee payment method is the first payment method, convert the entrusting fee into the repayment period of the financing, and adjust the determined repayment period of the financing based on the converted repayment period; and if the entrusting fee payment method is the second payment method, convert the entrusting fee into the loan interest rate of the financing, and adjust the determined loan interest rate of the financing based on the converted interest rate.

Preferably, the target transaction further includes an entrusting fee payment method specified by the light node, where the entrusting fee payment method includes a third payment method for separately paying the entrusting fee, and the calculation unit is configured to: if the entrusting fee payment method is the third payment method, skip adjusting the determined repayment period or loan interest rate of the financing.

Preferably, the core node includes a financial institution node and a core enterprise node, and the light node is a supplier node.

Correspondingly, the present specification further provides a financing apparatus, applied to a blockchain-based supply chain financial system, where the supply chain financial system includes a light node and a core node, and the apparatus includes: a publishing unit, configured to publish, by the light node, a target transaction for financing to the blockchain, where the target transaction includes account receivable information; and an invoking unit, configured to invoke, by the light node, a smart contract published by the core node for financing management, where the smart contract specifies a grant limit, a repayment period, and a loan interest rate of the financing that are determined by the core node, so as to complete a management operation on the financing.

The present specification further provides a computer device, including a memory and a processor. The memory stores a computer program that can be run by a processor; when running the computer program, the processor performs the steps described in the financing method performed by the core node.

Correspondingly, the present specification further provides a computer device, including a memory and a processor. The memory stores a computer program that can be run by a processor; when running the computer program, the processor performs the steps described in the financing method performed by the light node.

The present specification further provides a computer readable storage medium on which a computer program is stored, and when the computer program is run by a processor, the steps described in the financing method performed by the core node are performed.

Correspondingly, the present specification further provides a computer readable storage medium on which a computer program is stored, and when the computer program is run by a processor, the steps described in the financing method performed by the light node are performed.

It can be understood from the previous technical solutions that the blockchain-based supply chain financial system provided in the present specification provides technical support for an account receivable-based financing application initiated by a light node such as a supplier node, and helps the supply chain financial system independently implement financing management by creating an smart contract for the account receivable-based financing management. A core node of the supply chain financial system, such as a financial institution node or a core enterprise node, generally has a relatively high credit and a relatively high computer network device resource configuration, and can be entrusted with at least some service resources that the light node, such as the supplier node, should provide for the blockchain, so as to help the light node complete consensus calculation, ledger backup, or other operations on the blockchain, thereby providing technical support for account receivable-based financing of the light node. This vitalizes idle funds of the financial institution and brings incomes to the financial institution, provides the supplier with working capital to maintain its commercial development, and based on the technical support provided by the core enterprise, also provides the core enterprise with extended repayment periods, benefits of separately paying service charges, etc.

DESCRIPTION OF IMPLEMENTATIONS

In short, supply chain finance is a financing mode in which financial institutions such as banks link core enterprises to upstream and downstream enterprises to provide flexible financial products and services. Suppliers or distributors (hereinafter collectively referred to as suppliers) that provide products or services to core enterprises are often short of working capital because they cannot receive payment from the core enterprises in time, and commercial development of the suppliers is greatly limited. The core enterprises are usually large-scale enterprises with a high credit. As debtors, the core enterprises cannot provide more help for the suppliers' capital needs, except for making repayment within a repayment period agreed with the suppliers. Banks or other types of financial institutions (such as factoring companies) usually have a large amount of idle funds and high credits. How to use their high credits to improve the utilization of idle funds is also a problem for financial institutions.

Figure 1:
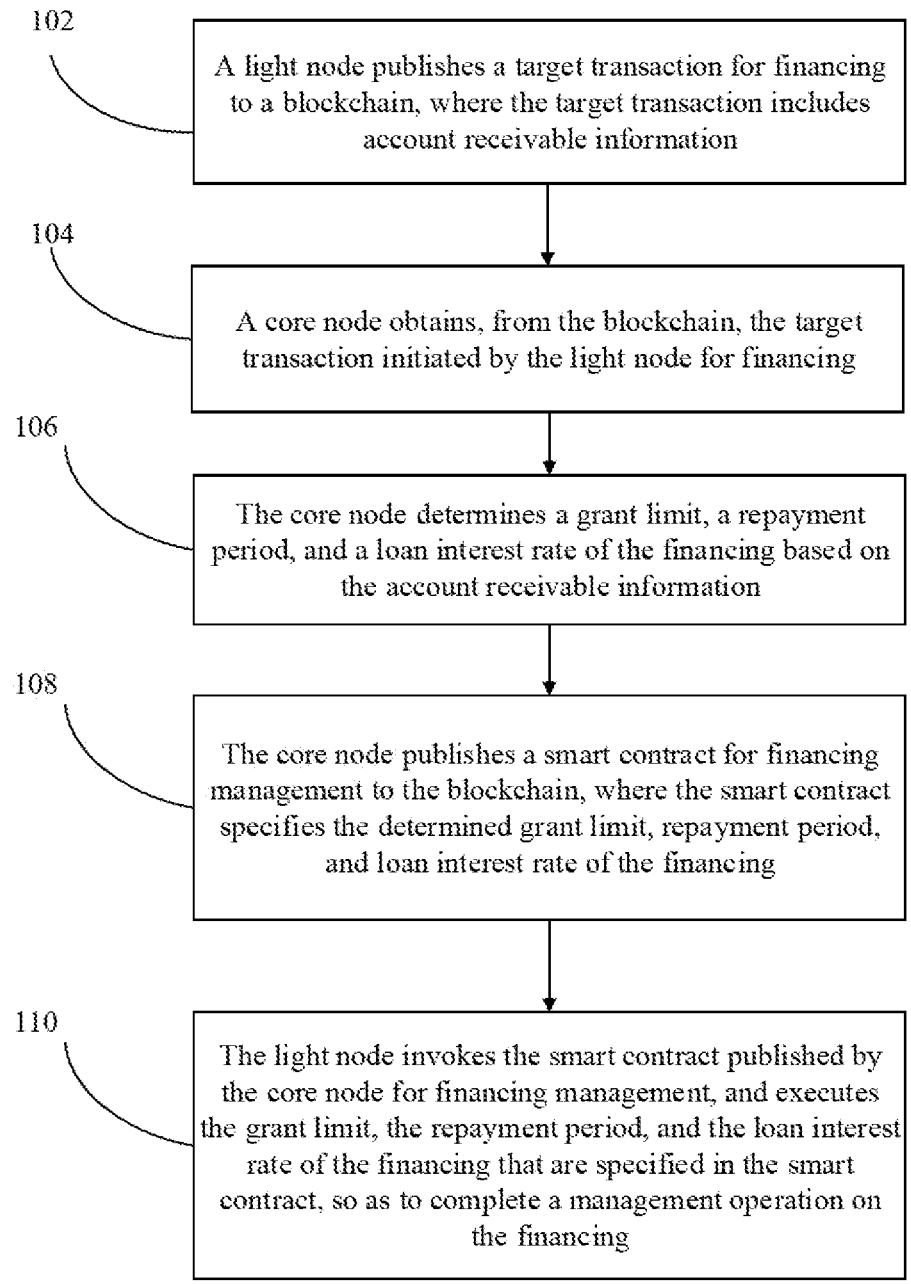
FIG. 1 is a flowchart illustrating a blockchain-based financing method, according to an implementation of the present specification.

In view of this, an example implementation of the present specification provides a financing method, applied to a blockchain-based supply chain financial system, where the supply chain financial system includes a light node and a core node. As shown in FIG. 1, the method includes the following steps.

Step 102: The light node publishes a target transaction for financing to the blockchain, where the target transaction includes account receivable information.

Step 104: The core node obtains, from the blockchain, the target transaction initiated by the light node for financing.

Step 106: The core node determines a grant limit, a repayment period, and a loan interest rate of the financing based on the account receivable information.

Step 108: The core node publishes a smart contract for financing management to the blockchain, where the smart contract specifies the determined grant limit, repayment period, and loan interest rate of the financing.

Step 110: The light node invokes the smart contract published by the core node for financing management, and executes the grant limit, the repayment period, and the loan interest rate of the financing that are specified in the smart contract, so as to complete a management operation on the financing.

In the implementations described in the present specification, the "blockchain" can specifically refer to a P2P network system that has a distributed data storage structure and that is completed by various network nodes by using a consensus mechanism. Data in the blockchain is distributed in blocks that are connected in time, and a block includes a data digest of the previous block. Full data of all or some nodes is backed up based on a specific consensus mechanism (for example, POW, POS, DPOS, or PBFT). A person skilled in the art knows that, because a blockchain system runs under a corresponding consensus mechanism, it is difficult for any node to tamper with data that has been recorded in a blockchain database. For example, in a blockchain that uses POW consensus, existing data can be possibly tampered with only when attacks with at least 51% of a network-wide hash rate reach a consensus. Therefore, the blockchain system has incomparable features of assuring data security and anti-tampering compared with other centralized database systems. The previous consensus operation in the blockchain generally requires a relatively high resource configuration of a computer and a network communications device, so as to perform data processing such as large-scale or high-concurrency calculation, verification, and broadcast communication.

It is worthwhile to note that the implementations provided in the present specification are not limited to the previous blockchain structure, and all other blockchain structures such as a public blockchain and a consortium blockchain that can implement the implementations described in the present specification fall within the protection scope of the present specification. A consensus algorithm and a specific consensus process that each network node uses when performing consensus processing on transaction data or the smart contract published to the blockchain are not described in detail in the present specification. A person skilled in the art can refer to a related technical record when implementing the technical solution described in the present specification.

The "supply chain financial system" described in the previous implementations refers to a blockchain-based system for providing a financing loan for a supplier. The "core node" refers to a "full node" in the blockchain in which the supply chain financial system is located. The full node is a node that has a complete blockchain ledger, and the full node can independently verify all transactions on the blockchain and update data in real time or asynchronously. The full node is mainly responsible for broadcasting, verification, and consensus of transactions in the blockchain. Because the core node needs to perform the previous data processing and backup, the core node generally has a higher computer or network device resource configuration and better data storage resources. In the supply chain financial system, because a financial institution (such as a commercial bank or a factoring company) and a core enterprise usually have a relatively high credit, in the previous blockchain, nodes in which the two members are located should be configured with relatively large computer network device and storage device resources, and can be the "core nodes" described in this implementation, so as to complete consensus operations such as reviewing a financing application of a supplier, reviewing account receivable information, and determining an interest rate and a term of a financing loan. Certainly, the "core node" described in the present specification can further include another full node that has an optimal hardware resource configuration, so as to join operations such as consensus calculation, data verification, and block backup of the blockchain in which the supply chain financial system is located. For example, the full node can be a network node in which a financial loan regulator, an industry regulatory department of the core enterprise, or an operator (if any) of the previous supply chain financial system is located. To complete deployment and consensus of the smart contract for the financing, the core node can further include a node in which a financial institution related to the financing or a superior organization of the financial institution, or a core enterprise related to the financing is located.

The "light node" described in the implementations provided in the present specification refers to a node that can selectively back up block data or delegate its own consensus authority to other representative nodes (e.g., core nodes) to complete consensus and recording of block data. In the previous implementation, the suppliers in the supply chain financial system generally join the blockchain in the form of light nodes because they do not often have large computer network device or storage device resources. The light node can retain the recent data writing and query function locally, and can initiate data query to the full node when there is a historical data query need. In the present specification, the light node of the supplier can publish a target transaction for financing to the blockchain based on capital needs of the light node of the supplier. The "light node" described in the present specification is not limited to the supplier node. Any user who is financing on the supply chain based on account receivable can join the blockchain in the form of light node to complete corresponding financing.

It is worthwhile to note that the transaction (transfer) described in the present specification refers to a piece of data that is created by a user by using a blockchain client and that needs to be finally published to a distributed database of the blockchain. Transactions in the blockchain include transactions in a narrow sense and transactions in a broad sense. A transaction in a narrow sense refers to a value transfer published by a user to the blockchain. For example, in a conventional Bitcoin blockchain network, a transaction can be a transfer initiated by a user in the blockchain. A transaction in a broad sense refers to service data that is published by a user to the blockchain and that has a service intention. For example, an operator can establish a consortium blockchain based on actual service needs, and deploy some other types of online services (for example, a loan application, a rental service, a vehicle scheduling service, an insurance claim service, a credit service, and a medical service) that are not related to value transfer in the consortium blockchain. In such consortium blockchain, a transaction can be a service message or a service request that is published by a user in the consortium blockchain and that has a service intention. The "target transaction for financing" described in the previous implementations refers to a service request intended to be reviewed by the core node to provide specific content of the financing. The specific content can include a grant limit, a repayment period, and a loan interest rate of the financing, etc. The target transaction should include the account receivable information on which the current financing service request is based, so each core node reviews the trade background authenticity of the account receivable. The account receivable information included in the target transaction can be raw information of the account receivable (such as a purchase and sales contract, an invoice, or account receivable or account payable information stored in a financial ERP), or can be an address link (such as an IPFS address link) of the raw information of the account receivable, or a transaction digest value (Tx Hash) of the raw information of the account receivable that is published to the blockchain. A specific form is not limited. Optionally, the target transaction used for financing can further include a target financing limit of the current financing, so as to facilitate a financial institution to perform credit approval on the target financing limit.

Based on the target transaction for financing initiated by the light node of the supplier, the core node, such as a financial lender node, can perform internal credit approval on the supplier to determine the grant limit, the loan interest rate, and the repayment period of the financing. The grant limit of the financing can be the principal amount of the loan made by the financial institution, or can be the sum of the principal amount and the interest amount of the loan made by the financial institution, or can be a net transfer amount of the loan made by the financial institution after interest and other service charges are deducted. The grant limit can be different based on specific setting of the financial institution, and is not limited here.

It is worthwhile to note that, because supply chain finance based on account receivable is divided into several forms, such as account receivable transfer financing and account receivable pledge financing, the repayment period determined by the core node can include a repayment period of a core enterprise related to the account receivable and/or a repayment period of a supplier related to the account receivable. In the account receivable transfer financing, the debtor, i.e., the core enterprise, shall repay its debts to the new creditor, i.e., the financial institution, due to the transfer of creditor's rights to the corresponding financial institution. If all the creditor's rights have been transferred, the core enterprise will no longer need to repay the account payable to the supplier, and the core node (including the financial institution node and the core enterprise node) should reach a consensus to confirm the repayment period of the core enterprise to the financial institution receiving the creditor's rights. If a part of the previous creditor's rights is transferred, the core nodes including the financial institution and the core enterprise need to confirm the repayment period of the core enterprise to the financial institution receiving the part of the creditor's rights, in addition to confirming the repayment period of the core enterprise to the supplier that still hold a part of the creditor's rights. In the account receivable pledge financing, because the creditor's rights are pledged and are not transferred to the corresponding financial institution, the debtor, i.e., the core enterprise, should repay its debts to the corresponding supplier, and the supplier should return the pledge loan to the financial institution issuing the loan. Therefore, the core nodes (including the financial institution node and the core enterprise node) should reach a consensus to confirm the time limit for the debtor, i.e., the core enterprise to return the accounts payable to the corresponding supplier and the time limit for the supplier to return the pledge loan to the financial institution issuing the loan. If the repayment further involves installments, the repayment period should also include the quantity of installments, the interval between installments, and the start and end period of installments.

After confirming the grant limit, the repayment period, and the loan interest rate of the current account receivable financing, the core node integrates the previous content and repayment logic related to the content into the smart contract for financing management. The smart contract is stored in the blockchain after obtaining consensus from the blockchain, so the light node initiates an instruction for invoking the smart contract at a proper time (that is, the time when the light node of the supplier confirms applying of the loan based on the content and the logic specified in the smart contract) to trigger automatic execution of the smart contract, so as to complete the management operation on the current financing. The management operation can include obtaining the loan based on the grant limit and the loan interest rate specified in the smart contract, and/or prompting or automatically executing scheduled fixed-amount repayment of the supplier or the core enterprise.

In the previous implementations described in the present specification, the capital loan request and financing management are implemented in a blockchain network. Compared with an account receivable financing process performed in the real world, financing convenience is improved, and labor costs are greatly reduced. In addition, the supplier can first publish the target transaction including the account receivable information to the blockchain based on a need of the supplier, so the core node evaluates and announces that the smart contract specifying specific loan content (including the grant limit, the repayment period, and the loan interest rate) of financing based on the account receivable is deployed and stored in the blockchain. The smart contract can be invoked at any time when the supplier needs capital, so as to obtain the corresponding amount of loan based on the financing management implemented by using the smart contract, and prompt to make repayment or automatic repayment based on the repayment method confirmed by all relevant parties after reaching a consensus. The mode of evaluation before invoking effectively ensures that the supplier obtains the full financing loan in a timely and fair way, prevents any delay in payment, and provides blockchain certificates for the whole process of the financing management.

In another implementation shown in the present specification, because of a low configuration of computer network device resources or storage resources, the light node of the supplier nominally borrows device resources of the core node, so as to complete data service operations (for example, participating in consensus reaching, data verification, packaging and recording of block data, and backup of block data) that the light node of the supplier should perform as a node of the blockchain. In other words, the light node can be considered as "entrusting" all or some service resources to the core node, and the core node is entrusted with data processing operations such as consensus verification, block accounting, or block data backup. When at least some service resources (i.e., resources for providing services to the blockchain network, including but not limited to consensus verification, block accounting, or block data backup) of the light node are entrusted to the core node, there can be multiple entrusting implementation methods. For example, when joining the blockchain, the light node of the supplier can specify a service resource entrusting type as the light node to the blockchain, including but not limited to types such as consensus authority entrusting, full block data backup entrusting, or partial block data backup entrusting, and the specifying can be presented in a transaction form. Later, if the entrusting service type of the light node of the supplier changes, a corresponding change transaction can be published to the blockchain, so as to facilitate historical tracing of the entrusting service type of the supplier.

Because the light node of the supplier entrusts, to the core node, all or some services that the light node of the supplier should provide as a member node of the blockchain, and completes the previous financing based on the blockchain, the light node of the supplier is obliged to pay a corresponding entrusting fee to the core node based on a specific entrusting service type of the light node of the supplier.

Therefore, before the core node publishes the smart contract for financing management to the blockchain, the core node should further determine an entrusting fee based on the entrusting service type of the light node of the supplier that initiates the target transaction for financing. In the supply chain financial system described in the present specification, a specific entrusting fee payment method can be as follows: adjusting a financing interest rate of the light node of the supplier, adjusting the repayment period of the light node of the supplier to the financial institution (when the financing form is account receivable pledge financing), or adjusting the repayment period of the core enterprise node to the financial institution or the supplier. Therefore, before publishing the smart contract, the core node should further adjust the determined repayment period or loan interest rate of the financing based on the entrusting fee.

The entrusting fee payment method can be set by the supply chain financial system, selected and specified by the core node, or selected and specified by the light node user of the supplier who initiates the target transaction for financing. Specifically, for one financing application, the target transaction published by the light node of the supplier further includes the entrusting fee payment method specified by the light node. The entrusting fee payment method includes a first payment method for converting the entrusting fee into the repayment period of the financing, and a second payment method for converting the entrusting fee into the loan interest rate of the financing.

The adjusting the determined repayment period or loan interest rate of the financing based on the entrusting fee includes: determining a specific type of the entrusting fee payment method specified by the initiator of the target transaction; and if the entrusting fee payment method is the first payment method, converting the entrusting fee into the repayment period of the financing, and adjusting the determined repayment period of the financing based on the converted repayment period. In view of computer network resources or storage device resources contributed by the core enterprise node and the financial institution node in the current financing management, the adjustment to the repayment period at the time of account receivable transfer financing can be correspondingly extending the repayment period of the core enterprise node to the financial institution node, or correspondingly extending the repayment period of the core enterprise node to the supplier node. The adjustment to the repayment period at the time of account receivable pledge financing can be correspondingly shortening the repayment period of the supplier node to the financial institution node. The adjustment to the repayment period described in the present specification is not limited to the previous example, and adjustment can be set based on specific financing services in actual services.

If the entrusting fee payment method is the second payment method, the entrusting fee is converted into the loan interest rate of the financing, and the determined loan interest rate of the financing is adjusted based on the converted interest rate. The adjustment generally represents further increasing the financing interest rate or financing costs of the light node of the supplier. For example, in the case of account receivable pledge financing, the supplier obtains the financing loan based on the account receivable or mortgage or pledge with other assets. The supplier should repay the financial institution within a specified repayment period (which can be installments) at an agreed interest rate. The second payment method of the entrusting fee is to convert the entrusting fee into the repayment interest rate of the supplier, so the supplier repays the financial institution at an interest rate higher than that when there is no entrusting fee. In the case of account receivable transfer financing, because the creditor's rights have been transferred or partially transferred to the financial institution, the core enterprise should return all or a part of the account payable to the financial institution. When the financial institution that serves as a core node issues a loan to the light node of the supplier, the financial institution usually deducts the interest profit of the financial institution in the current financing from the total amount of loan, and grants the loan (which can be installments) obtained after the interest deduction to the supplier. For example, the interest rate is 5%, and the grant limit is 95% of the total amount of loan. After the light node of the supplier uses the entrusting service of the core node, the second payment method of the entrusting fee is that the financial institution should deduct more interest when issuing the loan. For example, the interest rate is increased to 6%, and a less amount of loan is correspondingly issued to the supplier, i.e., 94%.

It is worthwhile to note that the "extending" or "shortening" the repayment period, or the "increasing" financing interest rate or financing costs described in the previous implementations provided in the present specification is compared with the case that the light node of the supplier does not entrust all or some entrusting resources to the core node, and is not compared with the repayment period, the financing interest rate, or the financing costs of the financing service in other supply chain financial systems or supply chain financing scenarios. Because the financing method provided in the present specification greatly reduces the financing costs in the real world or costs caused by hardware resource required for the supplier node in other online supply chain financing systems, the financing costs such as the repayment period and the financing interest rate in the financing method provided in the present specification are still much lower than those in other supply chain financing systems.

In addition, it is obvious that the entrusting fee payment method can further include making payment directly to the core node in a form of a service fee. The core node can be a node that specifically receives service resource entrusting of the light node of the supplier, or can be other or all core nodes that contribute to the current financing process. The contribution includes core computing (for example, complex consensus, privacy, security calculation), etc., so as to process large-scale or concurrent operations such as data encryption and decryption, transaction verification, block packaging, and broadcasting. If the entrusting fee payment method is the third payment method, the determined repayment period or loan interest rate of the financing does not have to be adjusted.

Based on the previous implementations described in the present specification, it can be understood that, based on the financing method provided in the present specification, the supplier does not need to configure costly computer or network device resources for accessing the blockchain to perform financing, and only needs to join the blockchain as a light node, and entrusts, to a high-credit financial institution or core enterprise node, a service that the supplier should contribute to the blockchain. In addition to reasonably making use of idle funds to obtain interest incomes in the financing service provided for the supplier, the financial institution node obtains extra incomes by using the large computer or network device resources configured by the financial institution node. Similarly, the core enterprise generally also has a relatively high credit. Based on relatively high configuration of computer or network device resources, the core enterprise contributes computer hash rate or storage resources on the blockchain to the financing of the supplier based on accounts receivable, so as to complete consensus operations such as reviewing the authenticity of the trade background of the account receivable information and determining the financing repayment period to assist the supplier in financing; and receives entrusting of the supplier node based on the high credit and the high hardware configuration of the core enterprise to help the supplier node to complete contributions that the supplier node should make as a blockchain node, thereby obtaining further benefits.

The smart contract that is deployed by the core node and that is used for financing management specifies the grant limit, the repayment period, and the loan interest rate of the financing that are determined by the core node. The light node of the supplier can trigger the smart contract at any time based on a capital need. Based on invoking of the smart contract initiated by the light node, the smart contract can prompt the financial institution to issue a loan in time, or when a corresponding financial institution has an entrusting fund in the smart contract, the smart contract can automatically perform an operation of issuing a loan. The smart contract can also prompt to make repayment within a corresponding repayment period, or automatically perform a repayment operation based on fund entrusting of a corresponding repayment party. Any operation performed by the smart contract can occur in a transaction form on the blockchain, thereby retaining a certificate for the whole process of the current financing. Compared with content such as a financing interest rate, repayment period, and repayment method that are agreed upon in a legal contract in the real world, the repayment logic specified in the smart contract is reached through multi-party consensus, thus reducing the time costs and labor costs for communication in the real world, which is fair and impartial and prevents any delay in payment.

Figure 4:
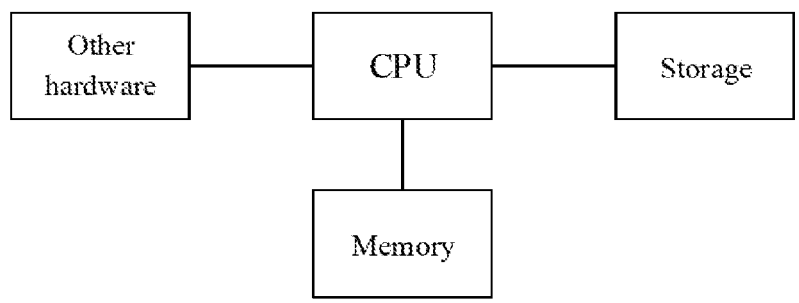
FIG. 4 is a hardware structural diagram illustrating an implementation of a financing apparatus, according to the present specification.

Corresponding to the previous process implementation, implementations of the present specification further provide a blockchain-based financing apparatus. The apparatus can be implemented by software, can be implemented by hardware, or can be implemented by a combination of hardware and software. Software implementation is used as an example. As a logical apparatus, the apparatus is formed by reading a corresponding computer program instruction into a memory by using a central processing unit (CPU) of a device that the apparatus is located. In terms of hardware implementation, in addition to the CPU, the memory, and the memory shown in FIG. 4, the device in which the financing apparatus is located generally further includes other hardware such as a chip for sending and receiving radio signals, and/or other hardware such as a card configured to implement a network communication function.

Figure 2:
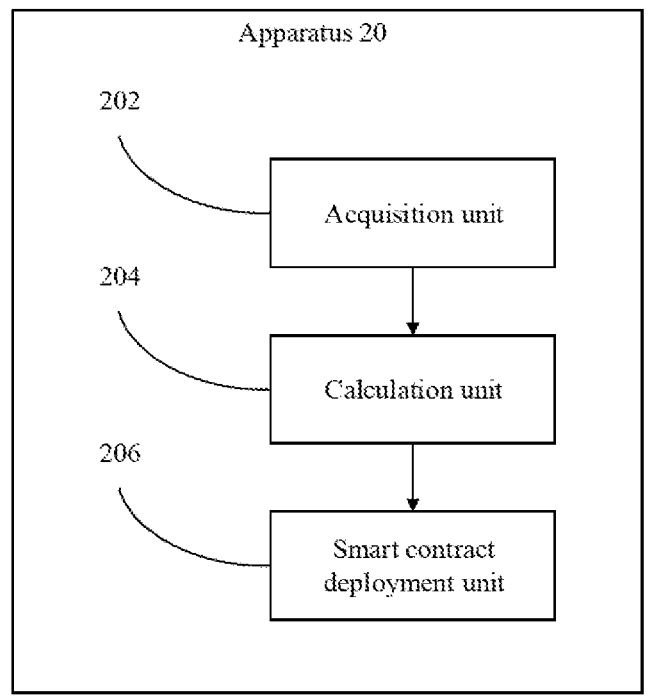
FIG. 2 is a schematic diagram illustrating a blockchain-based financing apparatus on a core node, according to an implementation of the present specification.

FIG. 2 shows a financing apparatus 20 according to the present specification, which is applied to a blockchain-based supply chain financial system, where the supply chain financial system includes a light node and a core node, and the apparatus 20 includes: an acquisition unit 202, configured to obtain, by the core node from the blockchain, a target transaction initiated by the light node for financing, where the target transaction includes account receivable information; a calculation unit 204, configured to determine, by the core node, a repayment period and a loan interest rate of financing based on the account receivable information; and a smart contract deployment unit 206, configured to publish, by the core node to the blockchain, a smart contract for financing management, where the smart contract specifies the determined repayment period and loan interest rate of the financing, so the light node invokes the smart contract to complete a management operation on the financing.

In another implementation, at least some service resources on the light node are entrusted to the core node; and the calculation unit is configured to: determine, by the core node, an entrusting fee based on an entrusting service type of the light node; and adjust the determined repayment period or loan interest rate of the financing based on the entrusting fee.

In another implementation, the target transaction further includes an entrusting fee payment method specified by the light node, and the entrusting fee payment method includes a first payment method for converting the entrusting fee into the repayment period of the financing, and a second payment method for converting the entrusting fee into the loan interest rate of the financing; and the calculation unit is configured to: determine a specific type of an entrusting fee payment method specified by an initiator of the target transaction; if the entrusting fee payment method is the first payment method, convert the entrusting fee into the repayment period of the financing, and adjust the determined repayment period of the financing based on the converted repayment period; and if the entrusting fee payment method is the second payment method, convert the entrusting fee into the loan interest rate of the financing, and adjust the determined loan interest rate of the financing based on the converted interest rate.

In another implementation, the target transaction further includes an entrusting fee payment method specified by the light node, where the entrusting fee payment method includes a third payment method for separately paying the entrusting fee, and the calculation unit is configured to: if the entrusting fee payment method is the third payment method, skip adjusting the determined repayment period or loan interest rate of the financing.

In another implementation, the core node includes a financial institution node and a core enterprise node, and the light node is a supplier node.

Figure 3:
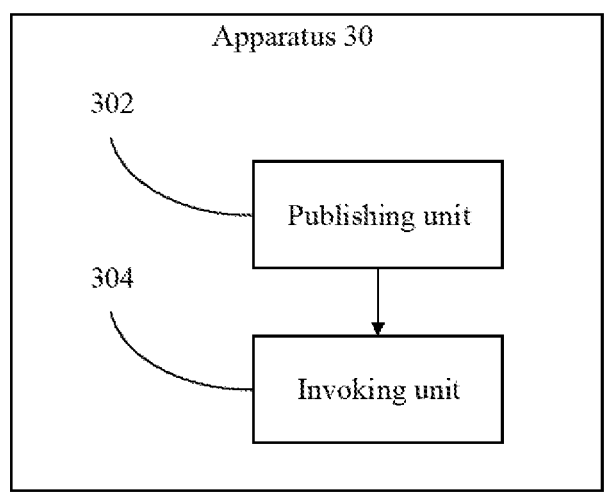
FIG. 3 is a schematic diagram illustrating a blockchain-based financing apparatus on a light node, according to an implementation of the present specification.

Correspondingly, FIG. 3 shows another financing apparatus 30 according to the present specification, which is applied to a blockchain-based supply chain financial system, where the supply chain financial system includes a light node and a core node, and the apparatus 30 includes: a publishing unit 302, configured to publish, by the light node, a target transaction for financing to the blockchain, where the target transaction includes account receivable information; and an invoking unit 304, configured to invoke, by the light node, a smart contract published by the core node for financing management, where the smart contract specifies a grant limit, a repayment period, and a loan interest rate of the financing that are determined by the core node, so as to complete a management operation on the financing.

For a specific implementation process of functions of units in the previous apparatus, refer to an implementation process of corresponding steps in the previous method. For related parts, refer to partial descriptions of method implementations. Details are omitted here for simplicity.

The previously described apparatus implementations are merely examples. The units described as separate parts may or does not have to be physically separate, and parts displayed as units may or may not be physical modules, can be located in one position, or can be distributed on a plurality of network modules. Some or all of the units or modules can be selected based on actual needs to achieve the objectives of the solutions of the present specification. A person of ordinary skill in the art can understand and implement the implementations of the present application without creative efforts.

The apparatus and units illustrated in the previously described implementations can be implemented by a computer chip or an entity, or can be implemented by a product with a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous method implementations, implementations of the present specification further provide a computer device, and the computer device includes a memory and a processor. The memory stores a computer program that can be run by the processor. When running the stored computer program, the processor performs steps of the financing method performed by the core node in the implementations of the present specification. For a detailed description of the steps of the financing method performed by the core node, refer to the previous content. Details are not described here.

Correspondingly, corresponding to the previous method implementations, implementations of the present specification further provide a computer device, and the computer device includes a memory and a processor. The memory stores a computer program that can be run by the processor. When running the stored computer program, the processor performs steps of the financing method performed by the light node in the implementations of the present specification. For a detailed description of the steps of the financing method performed by the light node, refer to the previous content. Details are not described here.

Corresponding to the previous method implementations, implementations of the present specification further provide a computer readable storage medium, and the storage medium stores a computer program. When the computer program is run by a processor, steps of the financing method performed by the core node in the implementations of the present specification are performed. For a detailed description of the steps of the financing method performed by the core node, refer to the previous content. Details are not described here.

Correspondingly, corresponding to the previous method implementations, implementations of the present specification further provide a computer readable storage medium, and the storage medium stores a computer program. When the computer program is run by a processor, steps of the financing method performed by the light node in the implementations of the present specification are performed. For a detailed description of the steps of the financing method performed by the light node, refer to the previous content. Details are not described here for simplicity.

The previous descriptions are merely preferred implementations of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPU), one or more input/output interfaces, one or more network interfaces, and one or more memories.

The memory may include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that implementations of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented supply chain method comprising:

performing, by a core node of a blockchain, a back-end blockchain data processing service entrusted to the core node by a light node of the blockchain, wherein the back-end blockchain data processing service comprises one or more of blockchain consensus calculation, blockchain ledger backup, or blockchain transaction verification;

obtaining, by the core node, from a ledger of the blockchain, a first blockchain transaction published to the ledger by the light node, the first blockchain transaction associated with financing between an entity associated with the light node and an entity associated with the core node;

obtaining, by the core node, from the ledger, a second blockchain transaction published to the ledger by the light node when the light node joins the blockchain, the second blockchain transaction specifying a type of the back-end blockchain data processing service entrusted to the core node by the light node;

determining, based on the second blockchain transaction, the type of the back-end blockchain data processing service entrusted to the core node by the light node;

calculating, by the core node, one or more financial parameters of the financing based on account receivable information included in the first blockchain transaction;

calculating, by the core node, an entrusting fee based on the type of the back-end blockchain data processing service entrusted to the core node by the light node, to compensate the entity associated with the core node for performing the back-end blockchain data processing service;

adjusting, by the core node, a first financial parameter of the one or more financial parameters of the financing to account for the entrusting fee; and publishing, by the core node, to the ledger, a financing management smart contract specifying the one or more financial parameters, including the adjusted first financial parameter, wherein the financing management smart contract is invocable by the light node to complete a management operation of the financing.

2. The computer-implemented method of claim 1, wherein the first blockchain transaction comprises an indication by the light node that the adjusted first financial parameter should be a repayment period of the financing, and wherein adjusting the first financial parameter comprises:
adjusting, by the core node, the repayment period of the financing based on the entrusting fee.

3. The computer-implemented method of claim 1, wherein the first blockchain transaction comprises an indication by the light node that the adjusted first financial parameter should be a loan interest rate of the financing, and wherein adjusting the first financial parameter comprises:
adjusting, by the core node, the loan interest rate of the financing based on the entrusting fee.

4. The computer-implemented method of claim 1, wherein the entity associated with the core node comprises a financial institution, and wherein the entity associated with the light node comprises a supplier.

5. A non-transitory, computer-readable medium storing one or more instructions that, when executed by a computer system, cause the computer system to perform operations comprising:

performing, by a core node of a blockchain, a back-end blockchain data processing service entrusted to the core node by a light node of the blockchain, wherein the back-end blockchain data processing service comprises one or more of blockchain consensus calculation, blockchain ledger backup, or blockchain transaction verification;

obtaining, by the core node, from a ledger of the blockchain, a first blockchain transaction published to the ledger by the light node, the first blockchain transaction associated with financing between an entity associated with the light node and an entity associated with the core node;

obtaining, by the core node, from the ledger, a second blockchain transaction published to the ledger by the light node when the light node joins the blockchain, the second blockchain transaction specifying a type of the back-end blockchain data processing service entrusted to the core node by the light node;

determining, based on the second blockchain transaction, the type of the back-end blockchain data processing service entrusted to the core node by the light node;

calculating, by the core node, one or more financial parameters of the financing based on account receivable information included in the first blockchain transaction;

calculating, by the core node, an entrusting fee based on the type of the back-end blockchain data processing service entrusted to the core node by the light node, to compensate the entity associated with the core node for performing the back-end blockchain data processing service;

adjusting, by the core node, a first financial parameter of the one or more financial parameters of the financing to account for the entrusting fee; and publishing, by the core node, to the ledger, a financing management smart contract specifying the one or more financial parameters, including the adjusted first financial parameter, wherein the financing management smart contract is invocable by the light node to complete a management operation of the financing.

6. The non-transitory, computer-readable medium of claim 5, wherein the first blockchain transaction comprises an indication by the light node that the adjusted first financial parameter should be a repayment period of the financing, and wherein adjusting the first financial parameter comprises:
adjusting, by the core node, the repayment period of the financing based on the entrusting fee.

7. The non-transitory, computer-readable medium of claim 5, wherein the first blockchain transaction comprises an indication by the light node that the adjusted first financial parameter should be a loan interest rate of the financing, and wherein adjusting the first financial parameter comprises:
adjusting, by the core node, the loan interest rate of the financing based on the entrusting fee.

8. The non-transitory, computer-readable medium of claim 5, wherein the entity associated with the core node comprises a financial institution, and wherein the entity associated with the light node comprises a supplier.

9. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:

performing, by a core node of a blockchain, a back-end blockchain data processing service entrusted to the core node by a light node of the blockchain, wherein the back-end blockchain data processing service comprises one or more of blockchain consensus calculation, blockchain ledger backup, or blockchain transaction verification;

obtaining, by the core node, from a ledger of the blockchain, a first blockchain transaction published to the ledger by the light node, the first blockchain transaction associated with financing between an entity associated with the light node and an entity associated with the core node;

obtaining, by the core node, from the ledger, a second blockchain transaction published to the ledger by the light node when the light node joins the blockchain, the second blockchain transaction specifying a type of the back-end blockchain data processing service entrusted to the core node by the light node;

determining, based on the second blockchain transaction, the type of the back-end blockchain data processing service entrusted to the core node by the light node;

calculating, by the core node, one or more financial parameters of the financing based on account receivable information included in the first blockchain transaction;

calculating, by the core node, an entrusting fee based on the type of the back-end blockchain data processing service entrusted to the core node by the light node, to compensate the entity associated with the core node for performing the back-end blockchain data processing service;

adjusting, by the core node, a first financial parameter of the one or more financial parameters of the financing to account for the entrusting fee; and publishing, by the core node, to the ledger, a financing management smart contract specifying the one or more financial parameters, including the adjusted first financial parameter, wherein the financing management smart contract is invocable by the light node to complete a management operation of the financing.

10. The computer-implemented system of claim 9, wherein the first blockchain transaction comprises an indication by the light node that the adjusted first financial parameter should be a repayment period of the financing, and wherein adjusting the first financial parameter comprises:
adjusting, by the core node, the repayment period of the financing based on the entrusting fee.

11. The computer-implemented system of claim 9, wherein the first blockchain transaction comprises an indication by the light node that the adjusted first financial parameter should be a loan interest rate of the financing, and wherein adjusting the first financial parameter comprises:
adjusting, by the core node, the loan interest rate of the financing based on the entrusting fee.

12. The computer-implemented system of claim 9, wherein the entity associated with the core node comprises a financial institution, and wherein the entity associated with the light node comprises a supplier.

13. The computer-implemented method of claim 1, wherein the adjusted first financial parameter comprises a loan interest rate or a loan repayment period.

14. The computer-implemented method of claim 1, wherein the core node has higher data processing resources than does the light node.

15. The computer-implemented method of claim 1, wherein the back-end blockchain data processing service entrusted to the core node by the light node comprises full block data backup or partial block data backup.

16. The computer-implemented method of claim 1, wherein the account receivable information included in the first blockchain transaction comprises a digest value of a third blockchain transaction published on the ledger, the third blockchain transaction comprising raw account receivable information.

* * * * *